US006978398B2

(12) United States Patent
Harper et al.

(10) Patent No.: US 6,978,398 B2
(45) Date of Patent: Dec. 20, 2005

(54) METHOD AND SYSTEM FOR PROACTIVELY REDUCING THE OUTAGE TIME OF A COMPUTER SYSTEM

(75) Inventors: Richard Edwin Harper, Chapel Hill, NC (US); Steven Wade Hunter, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 624 days.

(21) Appl. No.: 09/929,143

(22) Filed: Aug. 15, 2001

(65) Prior Publication Data

US 2003/0036882 A1 Feb. 20, 2003

(51) Int. Cl.[7] .............................................. G06F 11/00
(52) U.S. Cl. ......................................... 714/13; 714/47
(58) Field of Search ............................. 714/13, 15, 47, 714/38

(56) References Cited

U.S. PATENT DOCUMENTS

| | | | |
|---|---|---|---|
| 5,715,386 A | | 2/1998 | Fulton, III et al. |
| 6,023,772 A | * | 2/2000 | Fleming ........................ 714/13 |
| 6,112,136 A | * | 8/2000 | Paul et al. ................... 700/293 |
| 6,594,784 B1 | * | 7/2003 | Harper et al. .................. 714/47 |
| 6,629,266 B1 | * | 9/2003 | Harper et al. .................. 714/38 |
| 2002/0087612 A1 | * | 7/2002 | Harper et al. ................ 709/100 |
| 2002/0087913 A1 | * | 7/2002 | Harper et al. .................. 714/15 |
| 2003/0159084 A1 | * | 8/2003 | Murphy et al ................. 714/13 |

OTHER PUBLICATIONS

Y. Huang, C. Kintala, N. Kolettis, and N.D. Fulton; Software Rejuvenation: Analysis, Module, and Applications; Proceedings of 25th IEEE International Symposium on Fault-Tolerant Computing; pp. 381-380; Jun. 1995.*

Castelli et al.; Proactive management of software aging; Mar. 2001; IBM J. Res. & Dev.; vol. 45, No. 2; pp. 311-332.*

Garg, et al., "A Methodology for Detection and Estimation of Software Aging", In Proceedings of the Ninth Int'l Symposium of Software Reliability Engineering, Paderborn, Germany, Nov. 1998, pp. 1-10.

N.R. Draper et al., "Applied Regression Analysis", Second Edition, John Wiley & Sons, Inc., pp. 294-343, with Preface.

* cited by examiner

*Primary Examiner*—Scott Badermann
*Assistant Examiner*—Joshua Lohn
(74) *Attorney, Agent, or Firm*—E. Dwayne Nelson, Esq.; McGinn IP Law Group, PLLC

(57) ABSTRACT

A method (and system) of reducing a time for a computer system to recover from a degradation of performance in a hardware or a software in at least one first node of the computer system, includes monitoring a state of the at least one first node, and based on the monitoring, transferring a state of the at least one first node to a second node prior to the degradation in performance of the hardware or the software of the at least one first node.

1 Claim, 3 Drawing Sheets

METHOD AND SYSTEM FOR PROACTIVELY REDUCING THE OUTAGE TIME OF A COMPUTER SYSTEM

CROSS-REFERENCE TO RELATED APPLICATION

The present application is related to U.S. patent application Ser. No. 09/442,001, filed on Nov. 17, 1999, to Harper et al., entitled "METHOD AND SYSTEM FOR TRANSPARENT SYMPTOM-BASED SELECTIVE SOFTWARE REJUVENATION" assigned to the present assignee, and incorporated herein by reference.

BACKGROUND OF THE INVENTION

1. Field of the Invention

The present invention generally relates to a computer system, and more particularly to a method and system for proactively reducing the outage duration by using the predicted outages to proactively trigger and manage existing failure recovery functionality.

2. Description of the Related Art

When a computer system suffers an unplanned failure, a certain amount of time is required to recover from the failure. If the computer is a single node, stand-alone computer system, it must reboot and restart its application. If the computer is part of a multi-node high availability cluster architecture, it must failover (i.e., transfer) the application to another node in the cluster.

During this recovery time, after either rebooting or failing-over the application to another node in a cluster environment, the recovering system must reload a stale copy of its state from disk, load a transaction redo log from disk, and attempt to reconstruct an up-to-date copy of that state by replaying that transaction redo log against the stale state.

Depending on the amount of state and the length of the log, this can take much time (e.g., on the order of hours). Thus, it is highly desirable to find means to reduce this outage time. However, prior to the present invention, no such means has been known.

The availability achieved by the system is a strong function of the time required to perform the recovery. If the outage recovery time is halved, the unavailability is also halved. Hence, if a system having an availability of 0.999 can halve its outage recovery time, then its availability climbs to 0.9995. Such an improvement can be a significant competitive advantage in an industry whose customers are showing an increasing concern for availability.

However, as mentioned above, prior to the present invention, no such system (or means) has been known or developed.

SUMMARY OF THE INVENTION

In view of the foregoing and other problems, drawbacks, and disadvantages of the conventional methods and structures, an object of the present invention is to provide a method and structure in which outage times of computer systems can be proactively reduced.

In a first aspect of the present invention, a method (and system) of reducing a time for a computer system to recover from a degradation of performance in a hardware or a software in at least one first node of the computer system, includes monitoring a state of the at least one first node, and based on the monitoring, transferring a state of the at least one first node to a second node prior to the degradation in performance of the hardware or the software of the at least one first node.

In a second aspect, a method (and system) of reducing a lack of performance in a computer system having at least one primary node and a secondary node, includes determining whether a failure or lack of performance is imminent, based on the determining, commanding a secondary node to start an application if it is not already running, and to begin reading a state and redo log from a memory coupled to the primary node and the secondary node, commanding the secondary node to apply the redo log to its state, commanding the primary node to begin mirroring its dynamic state updates to the secondary node as they occur, such that the secondary node's state is brought completely up to date with the primary node, judging whether the primary node has failed, and based on the judging, making the secondary node become the primary node.

In a third aspect, a method (and system) of maintaining performance of a primary node in a computer system, includes monitoring the primary node of the computer system, determining whether the primary node is failing or about to fail, and migrating the state of the primary node to another node in the computer system, wherein there is other than a one-to-one relationship between the another node and the primary node.

In a fourth aspect, a method (and system) of reducing a degradation period of a Web hosting machine, includes monitoring a performance of the Web hosting machine, and transferring a state and subsequent Web page requests of the Web hosting machine to a second machine when a degradation of the performance occurs in the Web hosting machine.

In a fifth aspect, a method (and system) of reducing a degradation of performance in a computer system having at least one primary node and a secondary node, includes determining whether a degradation of performance of the primary node is imminent, based on the determining, commanding a secondary node to start an application if it is not already running, replicating, by the secondary node, a state of the primary node, and passing control to the secondary node.

In a sixth aspect, a method (and system) of reducing a degradation of performance in a computer system having a single node, includes determining whether a degradation of performance of the node is imminent, based on the determining, commanding the node to begin storing its state on a stable storage at a more frequent rate, to reduce a staleness of the state on the stable storage (and hence the amount of time required to reconstruct the node's state after the outage has occurred).

With the unique and unobvious aspects of the invention, outage times of computer systems can be proactively reduced.

The present invention exploits the ability to predict software outages (as described in, for example, in the above-mentioned U.S. patent application Ser. No. 09/442,001, entitled "METHOD AND SYSTEM FOR TRANSPARENT SYMPTOM-BASED SELECTIVE SOFTWARE REJUVENATION", to Harper et al., commonly-assigned and incorporated herein by reference) or hardware failures (which is reasonably well known in the art) to proactively migrate the state needed to quickly recover from an imminent outage onto another computer system (e.g., such as another node in a cluster environment) or a persistent storage medium (e.g., such as a hard disk).

In the example described above, the system that was about to fail (e.g., the "failing computer") would "prime" another computer (e.g., the "failover target") by directing it to read from disk the stale state and the redo log, and then direct the failover target computer to begin applying the redo log to the stale state.

Moreover, upon discovery of its imminent demise, the failing computer could mirror all transactions to the failover target, bringing the failover target's state even more up-to-date. When the primary computer does finally fail, the failover target would have an up-to-date copy of the state, the lengthy reloading of state and redo log from disk would be totally avoided, the outage would be shortened, and the system availability would be improved.

Thus, the present invention reduces outage duration by using the ability to predict outages to proactively trigger and execute functionality whose effect is to reduce that outage's duration.

Further, in the case of a single node, the amount of time required to reconstruct the node's state after the outage has occurred can be reduced significantly.

BRIEF DESCRIPTION OF THE DRAWINGS

The foregoing and other purposes, aspects and advantages will be better understood from the following detailed description of preferred embodiments of the invention with reference to the drawings, in which.

DETAILED DESCRIPTION OF PREFERRED EMBODIMENTS OF THE INVENTION

Figure 1:
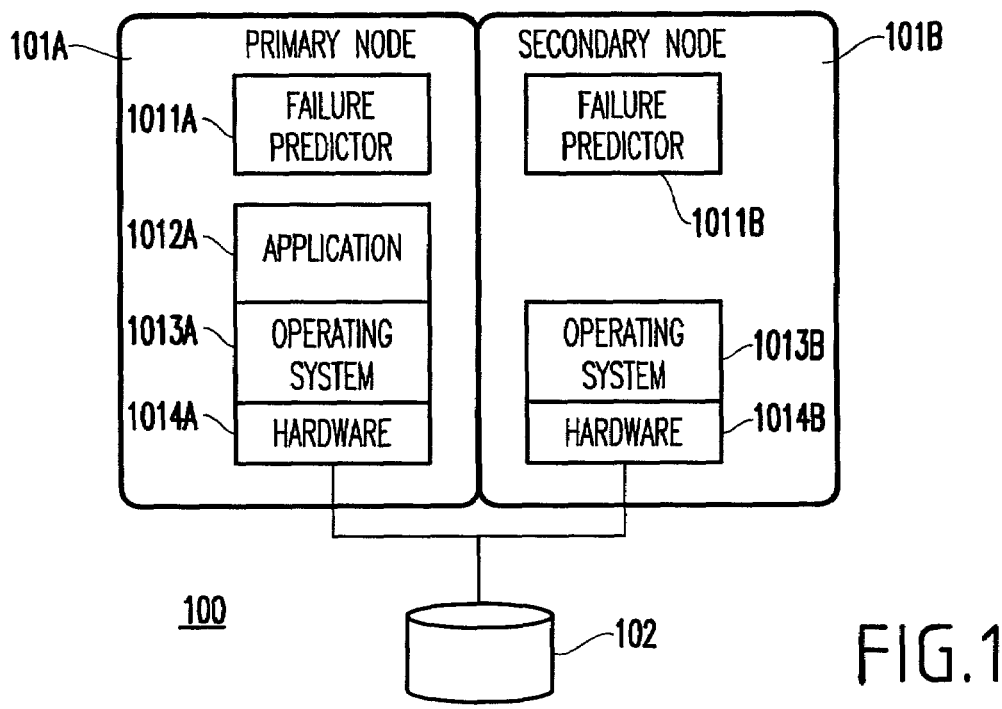
FIG. 1 illustrates a two-node cluster.

Referring now to the drawings, and more particularly to FIGS. 1–7, there are shown preferred embodiments of the method and structures according to the present invention.

Prior to describing the invention, it is noted that, for explanatory purposes, the present application describes the invention from a clustered database perspective, but it is equally applicable to other non-clustered architectures, and other application domains.

Preferred Embodiment

Figure 2:
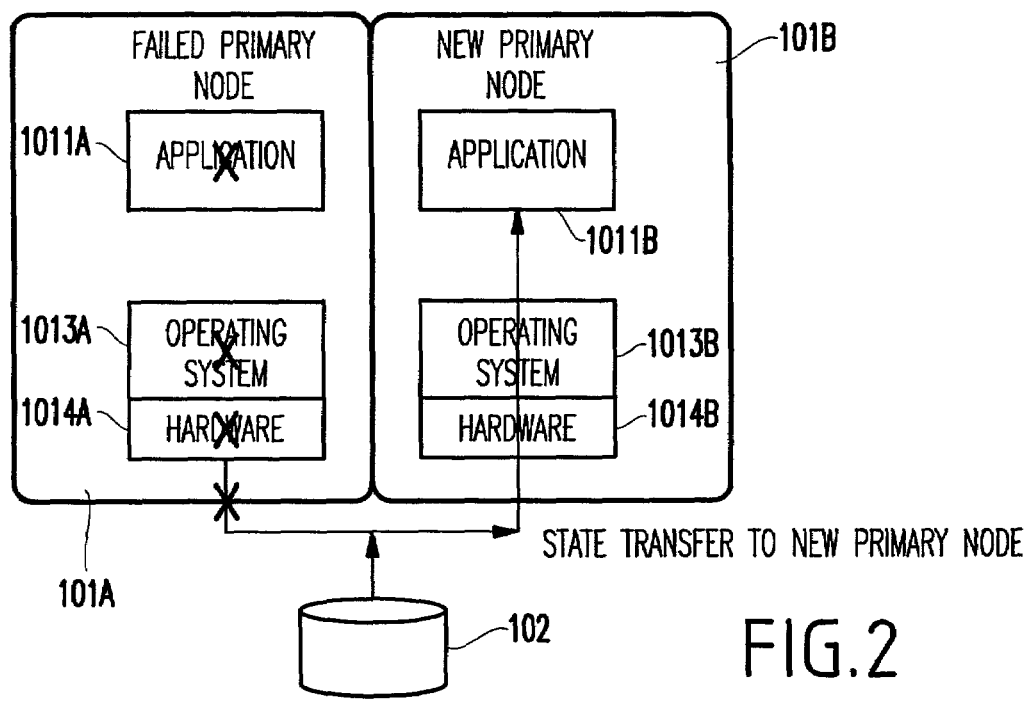
FIG. 2 illustrates a failover in a two-node cluster of FIG. 1 (e.g., without the invention in which the system is unavailable during a state transfer)
Figure 3:
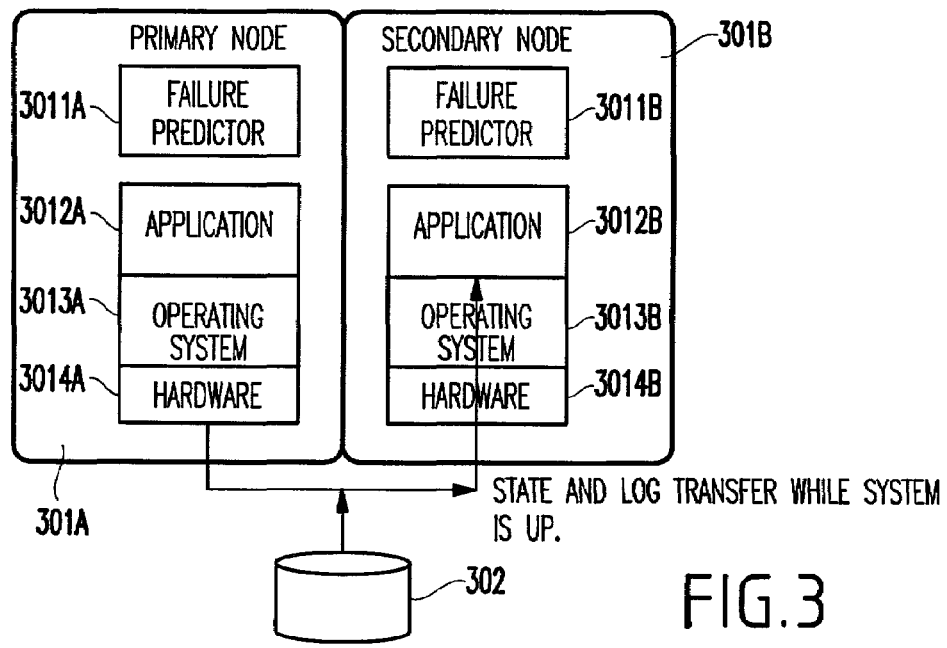
FIG. 3 illustrates a two-node cluster in which a failure is imminent and the system is still available utilizing the present invention.
Figure 4:
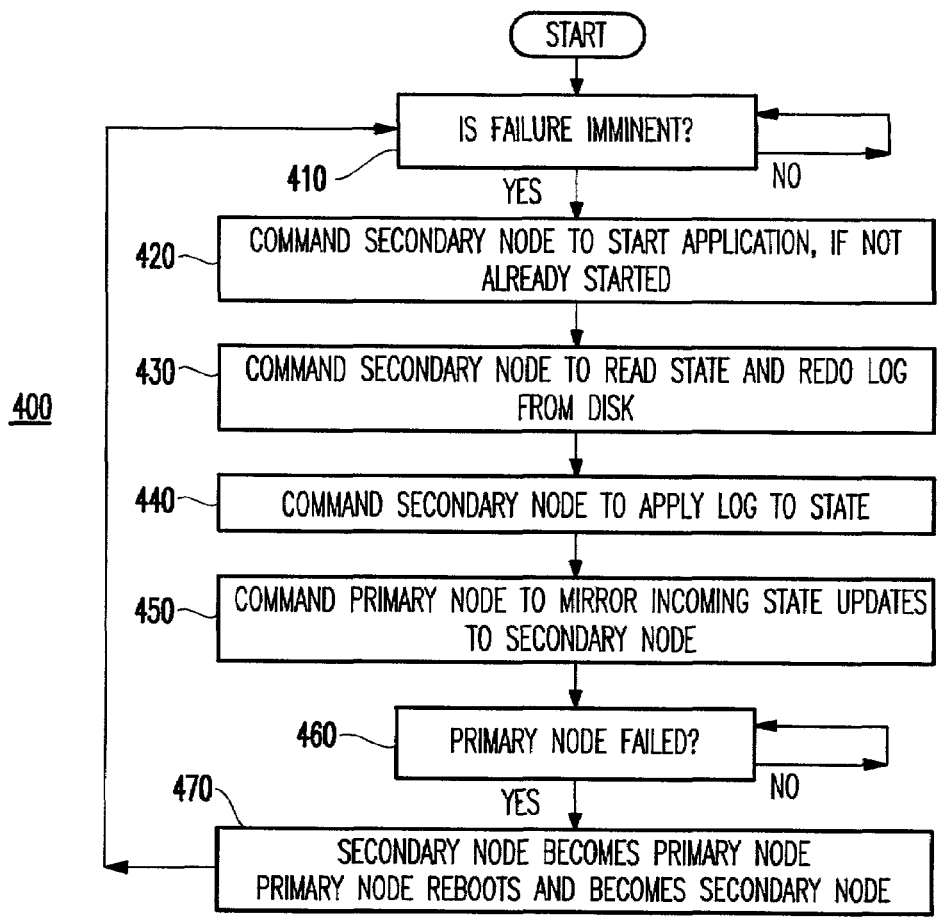
FIG. 4 illustrates a flowchart of a method 400 according to the present invention.

An exemplary embodiment of the present invention may reside in the clustered architecture 100 depicted in FIG. 1. For basis of comparison, FIGS. 1 and 2 show the clustered architecture 100 without the benefit of the present invention, and FIGS. 3 and 4 illustrate the architecture incorporating the present invention.

In FIG. 1, the architecture includes two nodes (e.g., a primary node 101A and a secondary node 101B). The invention is equally applicable to clusters having more than two nodes, or to single-node computer systems.

The application 1012A runs on the primary node 101A and the secondary node 101B lies in wait to take over application execution in the event of primary node failure.

A failure predictor 1011A (1011B) is running on either the primary node 101A or the secondary node 101B (e.g., it does not matter for the purposes of the present invention). The failure predictor 1011A (1011B) has the ability to predict software and/or hardware failures as described in the above-mentioned U.S. patent application Ser. No. 09/442,001.

The secondary node 101 A may or may not have an application 1012A already running. It does not matter for purposes of the present invention, since when the failure is predicted the secondary node 101B can be commanded to start the application 1012A in preparation to receive the primary node's state. Indeed, in a cluster system having more than two nodes, the secondary node 101B may not know which primary node 101A is going to fail until the failure is predicted, so it cannot have the primary node's application already running.

Additionally, each node has an operating system 1013A (1013B) and hardware 1014A (1014B).

Both the primary node 101A and the secondary node 101B are connected to a shared disk 102, containing the stale state and the redo log.

It is noted that the shared disk 102 is not required for the invention to operate, and the invention is not limited thereto in terms of either the hardware, the type of storage medium, or the connection therebetween (e.g., a physical connection is not required; the invention could operate merely with a storage medium merely accessible via network). However, such a disk exemplifies a mechanism and means for transferring a state between the two computers, and could be replaced by multiple private disks within each node that are updated based on a distributed shared disk model. As noted above, instead of the shared disk 102 (or in addition thereto), a network (e.g., Internet, intranet, etc.) could be coupled thereto via wired modem, infrared, radio frequency, optical, etc. mechanisms.

FIG. 1 represents a "cold stand-by" system in which no application is running on the secondary node, but it is waiting for failure of the primary to take over operations of the primary.

In FIG. 1, without the invention, when the primary node 101A fails (e.g., application, operating system, and/or hardware failure as shown), a system state must be transferred to the new primary node via the disk 102 and the redo log played against that state, as shown in FIG. 2 and described below.

Thus, FIG. 2 shows what happens when there is a failure in the primary node 101A. In the exemplary failure of FIG. 2, the application 1011A has failed, the operating system 1013A has failed and the hardware 1014A has failed. The invention is equally applicable to the case when any one or a combination of these has failed, which would result in the unavailability of the primary node.

Thus, the application 1011B must be started on the secondary 101B and the state of the primary 101A must be transferred to the secondary 101B (e.g., which becomes the new primary node). Depending on the size of the database and the length of the redo log, this process may take hours. During this time, the system is not available.

It is noted that the system of FIG. 2 may (or may not) have a failure predictor 1011B. In any event, in the scenario described above, no failure predictor 1011B is being used to effect a graceful state transfer.

The Invention

However, turning to FIG. 3 (and FIG. 4 which shows the operation of the invention), with the present invention, when a failure is predicted (e.g., a grayed-out application 3012A in a primary node 301A is about ready to fail), the state transfer takes place while the system is still operational, as shown below. Thus, the system is still available during this time.

A failure predictor 3011A (3011B) running on either a primary node 301A or a secondary node 301B commands the secondary node 301B to start an application 3012A (if it is not already running), and commands the secondary node 301B to begin reading the state and redo log from the disk 302.

Furthermore, the primary node 301A can be commanded to begin mirroring its dynamic state updates to the secondary node 301B as they occur, in an attempt to get the secondary node's state completely up to date. It is noted that the system is fully operational during this process, assuming that it completes before the primary node 301A fails.

If (and when) the predicted failure occurs, the outage time will be much shorter than it would have been had the proactive state transfer not taken place. If, instead, a rejuvenation is scheduled to avoid the unplanned failure, that rejuvenation would also be much shorter than it would have been had the invention not been employed.

It is noted that the invention is not limited to predicting only the application as failing. Hence, if the operating system and/or the hardware (and/or any other problem in the primary node that can be predicted) is undergoing a lack of performance or a failure, the invention is equally operable.

It is noted that the secondary node 301B needs no special hardware, etc., but only needs the logic to receive the state transfer and to take over the application.

Further, it is noted that the secondary node starts the application based on a command from another node. That is, if the invention is incorporated into a cluster, then there is a cluster manager that is running which makes the overall system appear as a single system. The cluster manager typically resides/runs on one of the nodes in the cluster. It may be on the primary node or another node and is provided by an additional application running on one of the nodes which provides a single point for management (e.g., a command point which collects data about the cluster and which tells the secondary node to start the application).

Hence, the secondary node's state is brought into coincidence with the stale state of the primary node (which is continuing to function), such that the secondary node begins to mirror the primary node.

It is further noted that the primary node need not actually fail, but instead it may be rejuvenated. Alternatively, the primary node could be intentionally failed (e.g., if it is a resource exhaustion failure) and then the primary node could be brought back. Hence, the situation/control could go back and forth between primary and secondary. Again, the secondary node may service a number of primary nodes.

Operation of the Invention

Turning to FIG. 4, a logic flow for an exemplary embodiment of a method 400 according to the present invention is shown and described herein below.

First, in step 410, it is determined whether a failure is imminent using known techniques as described above and in the copending application Ser. No. 09/442,001. If not (e.g., a "NO"), then the process simply loops back to step 410.

If failure is imminent (e.g., a "YES" in step 410), then in step 420, the secondary node 301B is commanded by a failure predictor to start an application 3012A (if it is not already running), and, in step 430, commands the secondary node 301B to begin reading the state and redo log from the disk 302.

In step 440, the second node is commanded to apply the redo log to its state.

In step 450, the primary node 301A is commanded to begin mirroring its dynamic state updates to the secondary node 301B as they occur, in an attempt to get the secondary node's state completely up to date. Once again, it is noted that the system is fully operational during this process.

In step 460, it is determined whether the primary node has failed. If not (e.g., a "NO" in step 460), then the process continues by looping to step 460 again.

If it is determined that the primary node has failed (e.g., a "YES" in step 460), then the process continues to step 470 at which time the secondary node becomes the primary node, and the primary node is rebooted and subsequently becomes the secondary node.

It is noted that instead of waiting for the primary node 301A to fail as indicated in the flowchart, alternatively the primary node 301A can be rejuvenated as described in the above-mentioned U.S. patent application Ser. No. 09/442,001. In that case, the rejuvenation itself would not cause any outage time.

Figure 5A:
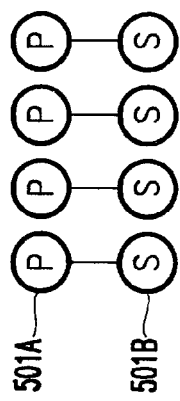
FIG. 5A illustrates a conventional one-to-one relationship in the conventional computer system between the secondary nodes and the primary nodes.

It is further noted that, with the invention, a dedicated secondary machine need not be provided for each and every processor acting as a primary, as in the conventional systems shown in FIG. 5A. That is, FIG. 5A illustrates a conventional "one-to-one" relationship in the conventional computer system between the secondary nodes 501B and the primary nodes 501A.

Figure 5B:
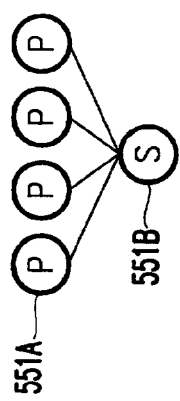
FIG. 5B illustrates a one-to-many relationship in the computer system between the secondary node and the primary nodes according to the present invention.
Figure 7:
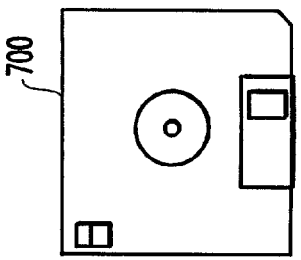
FIG. 7 illustrates a signal bearing medium (e.g., storage medium) 700 for storing steps of a program for proactively reducing the outage time (or degradation of performance) of a computer system, according to the present invention.

In contrast, FIG. 5B illustrates a "one-to-many" relationship in the computer system between the secondary node 551B and the primary nodes 551A according to the present invention.

That is, the conventional systems require a "hot" standby to be provided/active to avoid an outage and the attendant disruption, thereby requiring extreme and continuous synchronization between the machine (server) about to fail and a backup machine (server). Hence, the conventional systems require that a dedicated machine be provided as the "hot standby" since the state of the "hot standby" (secondary) must continually mirror that of the primary machine. Thus, a one-to-one relationship is required between the number of secondary machines and the number of primary machines.

In contrast, the invention can proactively search for a state of a backup machine, so that when the first machine does fail, a "hot" stand-by can be ready to go (e.g., assume the duties/state of the failing machine), thereby reducing the outage time and disruption required to "fail-over" from the original (failing) machine to the backup machine.

Moreover, with the ability to predict a failure, a stand-by machine need not be located until it is determined/seen that a potential chance for an outage occurs.

As such, the invention need not provide a "hot standby" for each and every machine, as in the conventional systems, since the secondary need not constantly mirror the states of all of the primary machines. Hence, a "one-to-many" relationship exists between the secondary machine and the primary machines. Thus, a secondary machine can be provided for a plurality of primaries, and when it is determined that one primary may be about to fail, the secondary machine can begin mirroring the state of the failing primary.

Thus, the invention need not wait for the failure to occur to begin monitoring and porting over the state of the failing machine, and further requires less hardware in providing adequate backup.

It is further noted that, at the time of failure, the invention avoids having to reload the entire suite of programs on the failing machine, thereby saving time by not having to reload the entire operating system, application programs, etc., beginning at time of failure.

By the same token, the invention may have to load the operating system or application program of the failing machine onto the secondary machine, thereby to match what failed. As known, rebooting and starting an application, etc. can take a long time, but if it is known that it is going to fail, then starting the application can be performed on the secondary machine along with loading the state across.

Thus, with the invention, a computer system is monitored and, as the computer system is determined to be failing (or about to fail), the state of the computer system is migrated to another machine.

Additionally, with the invention, there need not be a one-to-one relationship between the backup and the primary computer. That is, one backup computer (e.g., a secondary) can be provided for many primary machines.

Alternative Single-Node Embodiments

A computer system that is not part of a cluster and thus does not have a failover partner can also beneficially utilize this invention. After an unplanned outage in which the invention is not employed, such a computer must reconstruct a consistent version of its state from whatever condition it was in at the time of the failure. Depending on the pervasiveness of the state disruption caused by the failure and how stale the disk data might be, this reconstruction process can take a long time and incur a lengthy outage.

However, if the present invention is employed, when a software failure is predicted the single computer node can begin aggressively saving its state to stable storage so as to minimize the amount of reconstructive work to be done after the failure.

For example, if a database normally collects and aggregates state updates for ten seconds before writing them to disk, as is often done for performance purposes, then the disk may be up to ten seconds out of date when a failure occurs, and ten seconds' worth of transactions must be either lost or reconstructed.

However, if a failure is predicted and the principles of this invention are employed, the database can begin updating the disk much more frequently (e.g., perhaps once per second), thereby reducing the amount of lost or reconstructed data and thus the time required to execute failure recovery.

This same technique can be applied to an operating system that maintains an in-memory "write-back" file cache to improve performance (this includes almost all operating systems). That is, periodically the file cache is written back to disk to achieve data persistence, but this can occur as infrequently as every 30 seconds. Thus, the file system on disk can be up to 30 seconds out of date relative to the in-memory file cache, and much work/data can be lost and have to be discarded, redone, or otherwise recovered during the outage.

Using the present invention, when an imminent software or hardware failure is predicted, the operating system can begin writing the file cache to disk much more frequently, or even revert to a "write-through" policy, where any write to the file cache is immediately copied to disk. This would have the effect of ensuring that the data on disk is as to up-to-date as possible, and the duration of any disk recovery actions required would be minimized.

Figure 6:
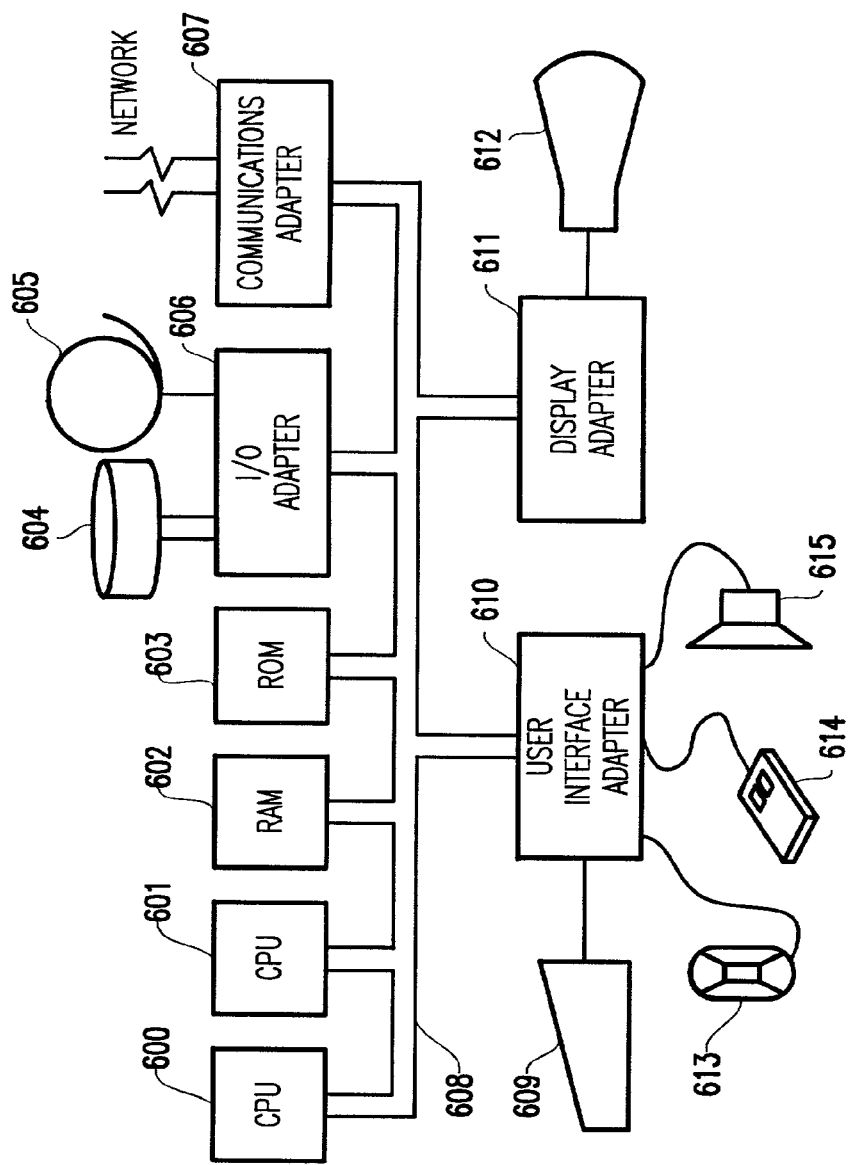
FIG. 6 illustrates an exemplary hardware/information handling system 600 for use with the present invention.

FIG. 6 illustrates a typical hardware configuration of an information handling/computer system in accordance with the invention and which preferably has at least one processor or central processing unit (CPU) 611.

The CPUs 611 are interconnected via a system bus 612 to a random access memory (RAM) 614, read-only memory (ROM) 616, input/output (I/O) adapter 618 (for connecting peripheral devices such as disk units 621 and tape drives 640 to the bus 612), user interface adapter 622 (for connecting a keyboard 624, mouse 626, speaker 628, microphone 632, and/or other user interface device to the bus 612), a communication adapter 634 for connecting an information handling system to a data processing network, the Internet, an Intranet, a personal area network (PAN), etc., and a display adapter 636 for connecting the bus 612 to a display device 638 and/or printer 639 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating the CPU 611 (FIG. 6), to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 611 and hardware above, to perform the method of the invention.

This signal-bearing media may include, for example, a RAM contained within the CPU 611, as represented by the fast-access storage for example. Alternatively, the instructions may be contained in another signal-bearing media, such as a magnetic data storage diskette 700 (FIG. 7), directly or indirectly accessible by the CPU 611.

Whether contained in the diskette 700, the computer/CPU 611, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

Thus, with the invention, outage times of computer systems can be proactively reduced. Further, the present invention reduces outage duration by predicting outages to proactively trigger and executing functionality to reduce that outage's duration.

While the invention has been described in terms of several preferred embodiments, those skilled in the art will recognize that the invention can be practiced with modification within the spirit and scope of the appended claims.

It is noted that the primary node and the secondary node are connected together via a shared database as shown in the Figures of the present application. Depending upon the type of application, the amount of shared data can be very large (e.g., in the case of a database) or very small (e.g., such as in a case of a machine set up as a Web server). In the latter case, the situation might be as simple as beginning to gracefully migrate connections over from one Web server to another Web server with very minimal shared data/space.

What is claimed is:

1. A method of reducing a time for a computer system to recover from a degradation of performance in a hardware or a software in at least one first node of said computer system, comprising:

monitoring a state of said at least one first node;

predicting an outage of said hardware or said software based on monitoring;

based on said monitoring, transferring a state of said at least one first node to a second node prior to said degradation in performance of said hardware or said software of said at least one first node;

proactively invoking a state migration functionality to reduce said recovery time, wherein said proactively invoking includes migrating a dynamic state to stable storage of said second node, said second node being accessible to a recovering agent, to reduce an amount of time required by said recovering agent; and connecting said at least one first node and said second node to a shared memory containing a stale state of the at least one first node and a redo log, wherein said shared memory includes at least one of a shared storage medium, a shared storage disk and a shared network, wherein said degradation of performance comprises one of an outage and a failure, wherein said second node selectively includes an application running corresponding to an application failing on said at least one first node while the at least one first node is still operational, wherein said state transfer from said at least one first node to said second node occurs while the at least one first node is still operational, and wherein said predicting comprises providing a failure predictor on at least one of said at least one first node and said second node, for commanding the at least one first node to start an application if not already running while the at least one first node is still operational, and commanding the second node to begin reading a state of said at least one node and redo log from the shared memory while the at least one first node is still operational.

* * * * *